3,016,357
**RESINOUS COMPOSITIONS OBTAINED BY BLEND-
ING ALKYD RESINS WITH THE RESINOUS CON-
DENSATION PRODUCTS OF ALDEHYDES WITH
MIXTURES OF BUTENYLPHENOLS**
Henry A. Vogel, Gibsonia, Pa., and Arthur F. Rylander and Robert F. Roach, Milwaukee, Wis., assignors to Pittsburgh Plate Glass Company, a corporation of Pennsylvania
No Drawing. Filed Jan. 13, 1959, Ser. No. 786,444
9 Claims. (Cl. 260—20)

This invention relates to heat hardenable resin compositions useful as coating for metals, and pertains more particularly to compositions obtained by blending alkyd resins with the resinous condensation products of aldehydes with mixtures of butenylphenols.

In U.S. Patents 2,843,565 and 2,843,566, it is disclosed that alkenylphenols, such as mono-, di- and tri-butenylphenols, condense with aldehydes, and particularly formaldehyde, in the presence of either an acidic or alkaline condensation catalyst to yield resinous products which possess many outstanding properties. For example, the resins thus obtained produce films which are relatively fast curing, and which are very light colored as compared with other phenolic resins. Also, the resins possess outstanding solvent and alkali resistance.

Prior to the discovery that mixtures of butenylphenols would condense with aldehydes to give light colored resins, it was believed that resins obtained by the condensation of aldehydes with phenolic compounds having unsaturated side chain substituents would invariably be dark colored unless complex measures were undertaken to prevent darkening.

For example, in U.S. Patent 2,006,043, it is disclosed that alkenylphenol-formaldehyde resins are reddish-brown in color and require several hours heating at temperatures as high as 125° C. to 150° C. to secure hard films.

In U.S. Patent 2,587,578, it is disclosed that darkening can be prevented if steps are taken to utilize only alkenylphenols in which any side chain substituent is on the para-position of the phenolic nucleus. The separation of the para isomer from the various other isomers normally present when alkenylphenols are prepared is, of course, a complex and costly procedure.

It has now been discovered, however, that the useful properties obtained by the condensation of mixtures of butenylphenols with aldehydes can be even further enhanced if such resins are blended with alkyd resins. The resulting compositions are useful in coating compositions utilized as metal primers, and for the coating of the exterior of containers employed for packaging food products. Such coating compositions are extremely light colored (as opposed to conventional phenolic-alkyd blends), adhere firmly and in continuous films to the metallic substrates to which they are applied, and bake quickly to give clear and extremely light colored films which are very resistant to the action of solvents, acids, alkalis, and other chemicals, and which show less discoloration than other types of phenolic resins when subjected to the temperatures utilized to solder the side seams of metallic containers. The compositions can be pigmented with materials such as titanium dioxide to give almost white sanitary coating compositions particularly useful on container closures.

The outstanding properties possessed by coating compositions comprising a blend of an alkyd resin with a resin prepared by condensing a mixture of butenylphenols with an aldehyde are believed due at least in part to the fact that the butenylphenols have a point of functionality which the alkyl substituted phenols do not possess, and in the case of the di- and tributenylphenols, have three additional points of functionality, because of the presence of the double bond in the saturated side chains. This added functionality is believed to give more carbon-to-carbon polymerization during the curing process, which results in a more strongly knit film of lower permeability and better solvent resistance than is obtainable from phenolics which do not possess one or more unsaturated side chains.

The butenylphenol-aldehyde resins which are blended with alkyd resins in accordance with the present invention are those prepared by the condensation of an aldehyde with a mixture of butenylphenols, which mixture contains from 50 percent to 70 percent by weight of monobutenylphenols, said monobutenylphenols consisting of substantially equal amounts of the ortho- and para-isomers. The other butenylphenols in the mixture are ordinarily dibutenylphenols and tributenylphenols. Small amounts of butenylphenol dimers and/or polymers may also be present.

One preferred method of preparing the mixtures of butenylphenols described in the preceding paragraph involves the reaction of butadiene-1,3 with phenol in the presence of a sulfuric acid catalyst having a concentration of approximately 65 percent to 75 percent, preferably about 68 percent. By utilizing this process, a reaction product is ordinarily obtained which contains about 11 percent unreacted phenol, 4 percent phenolic ethers, 58 percent monobutenylphenols, and 27 percent di- and tributenylphenols. The mixture of monobutenylphenols consists of substantially equal quantities of ortho-n-2-butenylphenol and para-n-2-butenylphenol. It is an important advantage of the present invention that the entire reaction mixture, including the unreacted phenol and the ethers, can be utilized in the condensation with the aldehyde, without deleterious effect upon the color of the resulting resin or the properties thereof.

It is to be understood that while a preferred method of obtaining the desired mixtures of butenylphenols involves the reaction of butadiene-1,3 with phenol in the presence of about 65 percent to 75 percent sulfuric acid, other methods of obtaining such mixtures may also be utilized. The preparation of such butenylphenol mixtures is described in detail in a series of copending applications, Serial Nos. 300,359, filed July 22, 1952, now U.S. Patent No. 2,864,868, and 337,226, 337,227 and 337,228, all filed February 16, 1953, and now abandoned.

The condensation of the butenylphenol mixture with aldehydes can readily be effected simply by bringing the mixture of butenylphenols and aldehyde together in the presence of either an acidic or alkaline catalyst, preferably by adding the aldehyde slowly to the butenylphenol-catalyst mixture at about room temperature (25° C.) until solution of the phenolic component is obtained, after which the temperature is allowed to rise to about 35° C., at which level it is maintained until the remainder of the aldehyde is added.

The reaction is then allowed to proceed for about 48 hours at room temperature. The reaction mixture is acidified to a pH of about 5.0 with a mineral acid such as hydrochloric acid or sulfuric acid or with a carboxylic acid such as acetic acid or propionic acid. During the acidification, two layers are formed, one of water and the other of butenylphenol-aldehyde resin. The water layer is then drawn off and the water-insoluble layer of resin is water washed 4 or 5 times.

The resinous product may be freed of any water remaining therein by vacuum stripping at a pressure of about 20 millimeters to 55 millimeters of mercury (absolute). Alternatively, the water may be removed azeotropically by adding xylene, toluene or butanol and distilling. The mixture may also be blown with an inert gas such as carbon dioxide or nitrogen to remove the water.

Useful expedients which may be employed in carrying out the condensation reaction involve the incorporation of an alkali metal hydrosulfite in the original reaction mixture to reduce any quinone type compounds present to the corresponding hydroquinone compounds. This prevents harmful color formation which takes place in the presence of quinone type compounds. Another useful expedient involves the addition to the acidified reaction mixture of a small portion of a complexing, a sequestering, or a chelating agent, for example, ethylenediaminetetraacetic acid, to inactivate any metallic ions which may be present and which also cause undesirable color in the resinous reaction product.

As set forth hereinabove, either acidic or alkaline catalysts may be employed. Preferably alkaline catalysts such as hexamethylenetetraamine, ammonia, sodium hydroxide, potassium hydroxide, and the like are utilized, although useful resins can also be obtained when the condensation is carried out in the presence of an acidic material such as hydrochloric acid or acetic acid.

In addition to formaldehyde, or substances which decompose on heating to yield formaldehyde, such as paraformaldehyde, trioxymethylene or hexamethylenetetraamine, other aldehydes, preferably composed of only atoms of carbon, hydrogen, and oxygen may also be utilized. Such other aldehydes includes acetaldehyde, butyraldehyde, and the like.

Butenylphenol-aldehyde resins which are most compatible with alkyd resins are obtained when the resinous condensation products prepared in the foregoing manner are heated with a hydroxyl compound in an acidic or essentially neutral reaction medium, that is, at a pH value of 7.0 or below. The nature of the hydroxyl compound utilized is not critical and may be varied considerably. Preferably, however, it is an alcohol of the structure ROH, wherein R is an alkyl radical such as methyl, ethyl, propyl, butyl, amyl, or 2-ethylhexyl. Butyl alcohol and 2-ethyl-hexanol-1 are especially useful for this purpose. Other alcohols which may be used, however, include castor oil, butanediol-1,4, soya alcohols, allyl alcohol, ethylene glycol, and the like. The amount of alcohol utilized in the process may also be varied widely, although in general it is desired that it be utilized in an amount about equal to the quantity of resin with which it is reacted. Larger or smaller quantities may be employed if desired.

It has been found that best results are obtained when the reaction is carried to a stage such that the quantity of alcohol which actually reacts with the resin is from about 10 percent to 30 percent by weight. The degree of reaction obtained can readily be calculated by determining the solids content of the resin before and after treatment, with the difference indicating the amount of alcohol which has reacted with the resin.

As indicated hereinabove, the heating with the alcohol is carried out in an acidic or essentially neutral medium, that is, at a pH of 7.0 or below. Preferably, the pH during the heating process is maintained at about 3.0 to 6.0. The amount of alcohol which reacts with the resin can be accurately controlled by adjustment of the pH, the reaction rate increasing as the pH of the medium is decreased. The desired pH can readily be obtained by initially acidifying the untreated resin with a mineral acid such as sulfuric acid, hydrochloric acid, or phosphoric acid, or an organic carboxylic acid such as acetic acid, propionic acid, oxalic acid, or maleic acid.

The alcoholation or etherification process is readily carried out simply by admixing the acidified resinous condensation product with the desired quantity of hydroxyl compound and catalyst and then heating at reflux temperature for a period of about 3 to 4 hours, after which the resin is recovered by filtering or other conventional means of separation. This simple procedure is preferred; however, generally equivalent results are obtained if the hydroxyl compound is added to the mixture of the butenylphenol and aldehyde during the condensation reaction, although it is more difficult to control the degree of reaction by this latter procedure. The reaction also takes place at temperatures lower than those required to obtain reflux, although the rate of reaction is likely to be slower at the lower temperatures.

The resin which is blended with a butenylphenol-aldehyde resin in accordance with the present invention may be any of the oil-modified or non-oil-modified alkyd resins utilized in the coatings field, most of which are readily available from commercial sources. Preferably, however, the alkyd utilized is of either short or medium oil length, that is, containing about 30 percent to 50 percent phthalic anhydride or its equivalent, these materials being generally more compatible with the butenylphenol-aldehyde resins than are the long oil length alkyd resins.

The drying oil utilized is preferably linseed oil; however, other drying or semi-drying oils such as fish oils, castor oil, soybean oil, and the like can be employed. It is also possible to replace a portion of the phthalic acid or anhydride in the alkyd with minor quantities of equivalent polyfunctional acids such as maleic acid or anhydride, fumaric acid, p-tertiary butyl benzoic acid, isophthalic acid, and the like, and in a similar manner a portion of the glycerin may be replaced with minor quantities of other polyfunctional alcohols such as pentaerythritol, trimethylol propane, ethylene glycol, or the like. Such other poly-functional acids or alcohols should not, of course, be utilized in amounts which cause the alkyd resin to gel during preparation.

Normally, the alkyd resin is prepared by heating the phthalic acid or anhydride and glycerin together with a drying oil derivative modified by ester interchange with glycerin in order to form the monoglycerides or diglycerides of fatty acids. In some instances "oil modification" is effected by first reacting the free fatty acid of a drying glyceride oil with glycerin to form mono- or diglycerides or mixtures thereof. These partial esters may then be incorporated with fatty acid and glycerin and the mixture heated to form the alkyd resin. It is also possible to obtain the oil modified resin by incorporation of the fatty acid and glycerin with the phthalic acid or anhydride and heating the mixture to reaction temperature. Preferably, the resin components are heated until water is evolved by condensation reaction and separated from the reaction zone. The reaction is continued until fairly high viscosity is obtained; for example, approximately W to Z or above when the resin is diluted by about 50 percent by weight xylol or other aromatic solvent. The alkyd resin and the butenylphenol-aldehyde resin can be blended in any desired amount, although when more than about 50 percent by weight of the butenylphenol-aldehyde resin is utilized, some incompatibility may arise. Consequently, it is preferred that the quantity of the butenylphenol-aldehyde resin be kept below about 35 percent by weight of the resinous component, and preferably in the range of about 25 percent to 35 percent.

No special expedients are necessary in formulating the coating compositions of this invention, since the resinous components are simply blended and not actually reacted. For example, they may be prepared simply by incorporating the resinous components in a suitable solvent system by simple agitation, or each resinous component may be dissolved in a solvent and the resulting solutions combined to form the finished coating composition. Solvents which may be utilized include butanol, methyl ethyl ketone, methyl isobutyl ketone, diacetone alcohol, butyl Cellosolve, Cellosolve, acetate, isophorone, and the like. It is to be understood, of course, that in formulation and application the choice of solvents will be dictated by the flow properties of the mixture in application, as well as the solvent compatibilities of the resins combined.

A particularly useful modifier for the coating compositions of this invention consists of a dark colored, high melting, thermoplastic resin comprised of a complex mixture of various chemical components derived from southern pine wood. These constituents include acidic materials derived from rosin acids and oxidized rosin acids, high molecular weight resins and acidic phenolic materials in the form of substituted phenolic ethers, polyphenols, and other high molecular weight phenols. The exact composition of the pine oil thermoplastic resin is not known, although a number of its properties have been determined. For example, one commercially available resin of this type, sold by the Hercules Powder Company under the name Vinsol Resin, has the following properties:

| | |
|---|---|
| Softening point: (Hercules drop method), °C. (°F.) | 116 (240) |
| (ASTM ring and ball), °C. (°F.) | 108 (226) |
| Acid number | 94 |
| Saponification number | 165 |
| Unsaponifiable matter (ASTM D 1065) percent | 7.7 |
| Gasoline soluble, percent | 17 |
| Acetone insoluble, percent | 0.05 |
| Toluene insoluble (ASTM D 269) percent | 15 |
| Gasoline insoluble, percent | 83 |
| Petroleum ether insoluble, percent | 98 |
| Methoxy (—OCH$_3$) content (ASTM or AOAC), percent | 5.3 |
| Oxygen absorption (300 lb./sq. in., 7 days), percent | 0.25 |
| Coefficient of cubical expansion per 1° C. (30° C.–170° C.) | 0.00056 |
| Density at 25° C. | 1.218 |
| Specific heat (20° C.–245° C.) | 0.50 |
| Bulking density, lb./cu. ft., approximately: | |
| Flake | 42 |
| Pulverized | 40 |

The glycerol ester of resins having the above general properties may also be blended with compositions containing epoxy resins and butenylphenol-aldehyde resins in accordance with this invention. A useful glycerol ester of this type has the following properties:

| | |
|---|---|
| Acid number | 20 |
| Pounds per gallon at 25° C. | 9.8 |
| Color | Black |
| Softening point (Hercules drop method, °C.) | 140–155 |

The following examples illustrate in detail the preparation of butenylphenol-aldehyde resins, the preparation of alkyd resins and the blending of the two resins into the coating compositions of the present invention. The examples are not intended to limit the invention, however, for there are, of course, numerous possible variations and modifications.

Example I

Two moles of a mixture of butenylphenols, including 50 percent to 70 percent of monobutenylphenols (substantially equal quantities of the ortho- and para-isomers), and the balance being dibutenylphenols and tributenylphenols, was admixed with 1 mole of formalin in the presence of concentrated hydrochloric acid. The resulting mixture was maintained at 25° C. for about 48 hours. The water layer was drawn off and the remaining reaction mixture distilled at reduced pressure until a viscosity of Z2–Z3 was obtained. Substantially quantitative yields of resin were obtained.

Example II

Example I is repeated except that three runs were made, utilizing furfural, crotonaldehyde, and acetaldehyde respectively as the aldehyde. In each instance a resinous condensation product suitable for forming films was obtained.

Example III

The following materials were charged into a glass-lined reactor:

24.6 pounds mixed butenylphenols (including 57.6 percent substantially equal amounts of the ortho- and para-monobutenylphenols, 27.6 percent of di- and tributenylphenols, 10.8 percent of phenol per se, and 4.0 percent of unidentified ethers)
27.0 pounds formalin solution (37 percent formaldehyde)
1.7 pounds sodium hydroxide
1.7 pounds water
0.12 pound sodium hydrosulfite The resulting mixture was cooled to about 75° F. to 80° F. and the reaction mixture agitated for 5 hours after which it was allowed to stand for an additional 43 hours. The reaction mixture was then acidified to a pH of 5.0 with 68 percent sulfuric acid, and allowed to stand until a water layer settled out. The water layer was then drawn off and discarded. The wet resin (36.25 pounds) was treated with 0.04 pound of an aminotetracarboxylic acid known commercially as Sequestrene AA. The resin was then heated to 220° F. and stripped with an inert gas until a Gardner viscosity of W at 75 percent solids in n-butanol was reached. The resin was then thinned with 10 pounds of n-butanol and filtered at 110° F. The product thus obtained had the following properties:

| | |
|---|---|
| Weight per gallon | 8.45 pounds. |
| Solids | 66.2 percent at 110° C. |
| Viscosity (Gardner) | Q to R. |

Examples IV to X

In the following examples, a number of different alcohols was heated with butenylphenol-formaldehyde resins (prepared according to the method of Example II and distilled to remove any solvent present). In each example, 100 grams of butenylphenol-formaldehyde resin and 0.2 gram of maleic anhydride were admixed with the alcohol. In Examples IV through IX, 100 grams of toluene were added and the mixture refluxed azeotropically for 3 hours (in Example VI for 2 hours); in Example X, the toluene was omitted and the mixture heated to reflux. The specific alcohol utilized and the quantity thereof, the yield, the percent solids, the Gardner color and the viscosity are set forth in the accompanying table:

| Example | Charge | | | Yield (Parts) | Percent Solids | Color (Gardner) | Viscosity (Gardner) |
|---|---|---|---|---|---|---|---|
| | Parts Toluene | Alcohol | Parts Alcohol | | | | |
| IV | 100 | Butyl Alcohol | 25 | 201.1 | 50.8 | 7 | A– |
| V | 100 | Castor Oil Alcohol | 25 | 226.0 | 49.1 | 6 | E–F |
| VI | 100 | Butane diol-1, 4 | 25 | 227.6 | 46.2 | 6 | A– |
| VII | 100 | Soya Alcohol | 25 | 200.2 | 54.9 | 6 | A– |
| VIII | 100 | Lauryl Alcohol | 25 | 226.4 | 46.5 | 6 | A– |
| IX | 100 | 2-Ethyl Hexanol-1 | 25 | 225.7 | 46.6 | 6 | A– |
| X | | Allyl Alcohol | 100 | 202.4 | 48.5 | 7–8 | A– |

The resinous composition obtained in the above examples was in each instance more compatible with alkyd resins than the butenylphenol-formaldehyde resin before reaction with the alcohol. The final resinous products were also more stable than a butenylphenol-aldehyde resin which had not been reacted with an alcohol.

*Example XI*

An alkyd resin was prepared by cooking together 48.7 percent by weight of soya oil, 35.6 percent by weight of phthalic anhydride, and 20.0 percent by weight of pentaerythritol. The resin was diluted to 50 percent solids in aromatic solvents to give a solution having a viscosity of W, an acid number of 17, and a weight per gallon of 8.07 pounds.

*Example XII*

An alkyd resin was prepared by cooking together 39.3 percent of distilled cottonseed acids (iodine value 140), 37.8 percent by weight phthalic anhydride, 23.1 percent by weight glycerin, and 10.6 percent by weight para-t-butyl benzoic acid. The resin was thinned to 50 percent solids in aliphatic solvents, the resultant solution having a viscosity of X, an acid number of 4–5, and a weight per gallon of 7.93 pounds.

*Example XIII*

The alkyd resin of Example XI was blended in an amount of 65 percent by weight with 25 percent by weight of the butenylphenol-formaldehyde resin of Example IV, and 10 percent by weight of a glycerol ester of southern pine wood resin (Vinsol ester gum), and the resulting composition coated at 18–20 mgm./4 sq. in. and baked for 12 minutes at 420° F. The film withstood fabrication, dry heat, and water processing, and had a pleasing light gold appearance.

In a second composition the Vinsol ester gum was omitted and 35 percent by weight of the butylated butenylphenol-aldehyde resin was utilized. Films of the resulting composition adhered well to a metal panel and withstood fabrication into a punched container closure. Dry heat and water processing had no harmful effect on the film.

*Example XIV*

The alkyd resin of Example XII was combined with the butenylphenol-aldehyde resin of Example IV, each component being present in an amount of 50 percent by weight. The films of the composition were baked for 12 minutes at 400° C., and the resulting films fabricated into container closures without loss of adhesion. The films also had a pleasing gold color and were not affected by the heat utilized in soldering container side seams.

Good results are also obtained when alkyd resins other than those of the specific examples are employed, or when other quantities of butenylphenol-aldehyde resins are utilized. It is also possible to obtain excellent colored films by the addition of color pigments, or to modify the compositions of the examples by inclusion of minor quantities of other resinous materials such as vinyl resins, epoxy resins, or the like.

Thus, although specific examples of the invention have been set forth hereinabove, it is not intended to limit the invention thereto, for it is apparent that various embodiments of the invention, in addition to those specifically disclosed, may be provided without departing from the spirit and scope of the invention as defined in the appended claims.

This application is a continuation-in-part of co-pending application, Serial No. 559,529, filed January 17, 1956, now abandoned.

We claim:
1. A heat hardenable resinous coating composition comprising about 50 percent to 95 percent by weight of an oil modified alkyd resin and about 5 percent to 50 percent by weight of the resinous condensation product of an aldehyde and a mixture of butenylphenols containing about 50 percent to 70 percent by weight of substantially equal amounts of orthobutenylphenol and para-butenylphenol.

2. The composition of claim 1 wherein the aldehyde is formaldehyde.

3. A heat hardenable resinous coating composition comprising about 65 percent to 75 percent by weight of an oil modified alkyd resin, and about 25 percent to 35 percent by weight of the resinous condensation product of an aldehyde and a mixture of monobutenylphenols, dibutenylphenols, and tributenylphenols, said mixture containing about 50 percent to 70 percent by weight of substantially equal quantities of ortho-monobutenylphenols and para-butenylphenols.

4. The composition of claim 3 wherein the aldehyde is formaldehyde.

5. The composition of claim 4 wherein the alkyd resin is the reaction product of soya oil, phthalic anhydride, and pentaerythritol.

6. The composition of claim 4 wherein the alkyd resin is the reaction product of cottonseed oil, phthalic anhydride, glycerin and para-t-butyl benzoic acid.

7. A heat hardenable resinous composition characterized by the property of forming light colored, hard, adherent films when baked on metallic surfaces, comprising about 50 percent to 95 percent by weight of an oil modified alkyd resin, and about 5 percent to 50 percent by weight of the resinous condensation product of formaldehyde, a lower alkanol containing from about 1 to 8 carbon atoms, and a mixture of monobutenylphenols, dibutenylphenols, and tributenylphenols, said mixture containing about 50 percent to 70 percent by weight of substantially equal quantities of ortho- monobutenylphenols and para-monobutenylphenols.

8. The composition of claim 7 wherein the lower alkanol is butanol and the oil modified alkyd resin is the reaction product of soya oil, phthalic anhydride, and pentaerythritol.

9. The composition of claim 7 wherein the lower alkanol is butanol and the oil modified alkyd resin is the reaction product of cottonseed oil, phthalic anhydride, glycerin, and para-t-butyl benzoic acid.

References Cited in the file of this patent

UNITED STATES PATENTS

| | | |
|---|---|---|
| 2,006,043 | Dykstra | June 25, 1935 |
| 2,242,250 | Honel et al. | May 20, 1941 |
| 2,843,566 | Christenson et al. | July 15, 1958 |
| 2,871,208 | Christenson et al. | Jan. 27, 1959 |

OTHER REFERENCES

Payne: "Organic Coating Tech.," vol. 1, pp. 269–77, pp. 296–98, John Wiley (1954).

UNITED STATES PATENT OFFICE
CERTIFICATE OF CORRECTION

Patent No. 3,016,357 January 9, 1962

Henry A. Vogel et al.

It is hereby certified that error appears in the above numbered patent requiring correction and that the said Letters Patent should read as corrected below.

Column 2, line 3, for "chains" read -- chain/s --; column 3, line 28, for "includes" read -- include --.

Signed and sealed this 25th day of December 1962.

(SEAL)
Attest:

ERNEST W. SWIDER
Attesting Officer

DAVID L. LADD
Commissioner of Patents